(12) United States Patent
Tanaka et al.

(10) Patent No.: US 11,332,072 B2
(45) Date of Patent: May 17, 2022

(54) DRIVING ASSISTANCE APPARATUS, DRIVING ASSISTANCE METHOD, AND COMPUTER-READABLE RECORDING MEDIUM

(71) Applicants: FUJITSU LIMITED, Kawasaki (JP); HONDA MOTOR CO., LTD., Tokyo (JP)

(72) Inventors: Masuhito Tanaka, Meguro (JP); Kazuki Takano, Hitachiota (JP); Hidehiro Takeda, Yokohama (JP); Ryo Washizuka, Kokubunji (JP); Taro Odagiri, Ota (JP); Toshihiro Hashimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/885,886

(22) Filed: May 28, 2020

(65) Prior Publication Data
US 2020/0384916 A1    Dec. 10, 2020

(30) Foreign Application Priority Data

Jun. 7, 2019  (JP) .............................. JP2019-107394

(51) Int. Cl.
| | | |
|---|---|---|
| *B60Q 1/00* | (2006.01) | |
| *B60Q 9/00* | (2006.01) | |
| *H04R 1/32* | (2006.01) | |
| *G08G 1/16* | (2006.01) | |

(52) U.S. Cl.
CPC ............. *B60Q 9/008* (2013.01); *G08G 1/165* (2013.01); *H04R 1/32* (2013.01)

(58) Field of Classification Search
CPC . B60Q 9/008; H04R 1/32; H04R 3/12; H04R 1/406; H04R 3/005; H04R 2499/13; G08G 1/165; B60W 50/14; B60W 2050/143
See application file for complete search history.

(56) References Cited

U.S. PATENT DOCUMENTS

| | | | | |
|---|---|---|---|---|
| 2010/0033313 A1* | 2/2010 | Keady | .................. | G08G 1/0965 340/438 |
| 2013/0009791 A1* | 1/2013 | Yoshioka | ............... | G08G 1/166 340/935 |
| 2013/0188794 A1* | 7/2013 | Kawamata | ............. | G08G 1/163 381/56 |
| 2013/0328701 A1* | 12/2013 | Sato | ........................ | G01S 3/808 340/943 |

(Continued)

FOREIGN PATENT DOCUMENTS

| | | |
|---|---|---|
| JP | 2005-316704 | 11/2005 |
| JP | 2009-78628 | 4/2009 |

(Continued)

*Primary Examiner* — Munear T Akki
(74) *Attorney, Agent, or Firm* — Staas & Halsey LLP

(57) ABSTRACT

A driving assistance apparatus includes a memory, and a processor coupled to the memory and configured to detect a state of surroundings of a mobile body, and reduce, when an object is detected during when a stationary sound is continuously output to a subject by using a plurality of sound sources that are arranged around the subject aboard the mobile body, output of the stationary sound toward the subject from a direction in which the object is detected.

15 Claims, 12 Drawing Sheets

(56) References Cited

U.S. PATENT DOCUMENTS

| | | | |
|---|---|---|---|
| 2014/0241532 A1* | 8/2014 | Sato | G01S 3/86 |
| | | | 381/56 |
| 2015/0110285 A1* | 4/2015 | Censo | G10K 11/178 |
| | | | 381/71.4 |
| 2018/0077492 A1 | 3/2018 | Yamada et al. | |
| 2019/0279505 A1* | 9/2019 | Kawauchi | G08G 1/0962 |
| 2020/0066070 A1* | 2/2020 | Wells | G05D 1/0088 |
| 2020/0086788 A1* | 3/2020 | Pivnicka | H04R 3/12 |

FOREIGN PATENT DOCUMENTS

| | | |
|---|---|---|
| JP | 2009-259102 | 11/2009 |
| JP | 2018-41394 | 3/2018 |

* cited by examiner

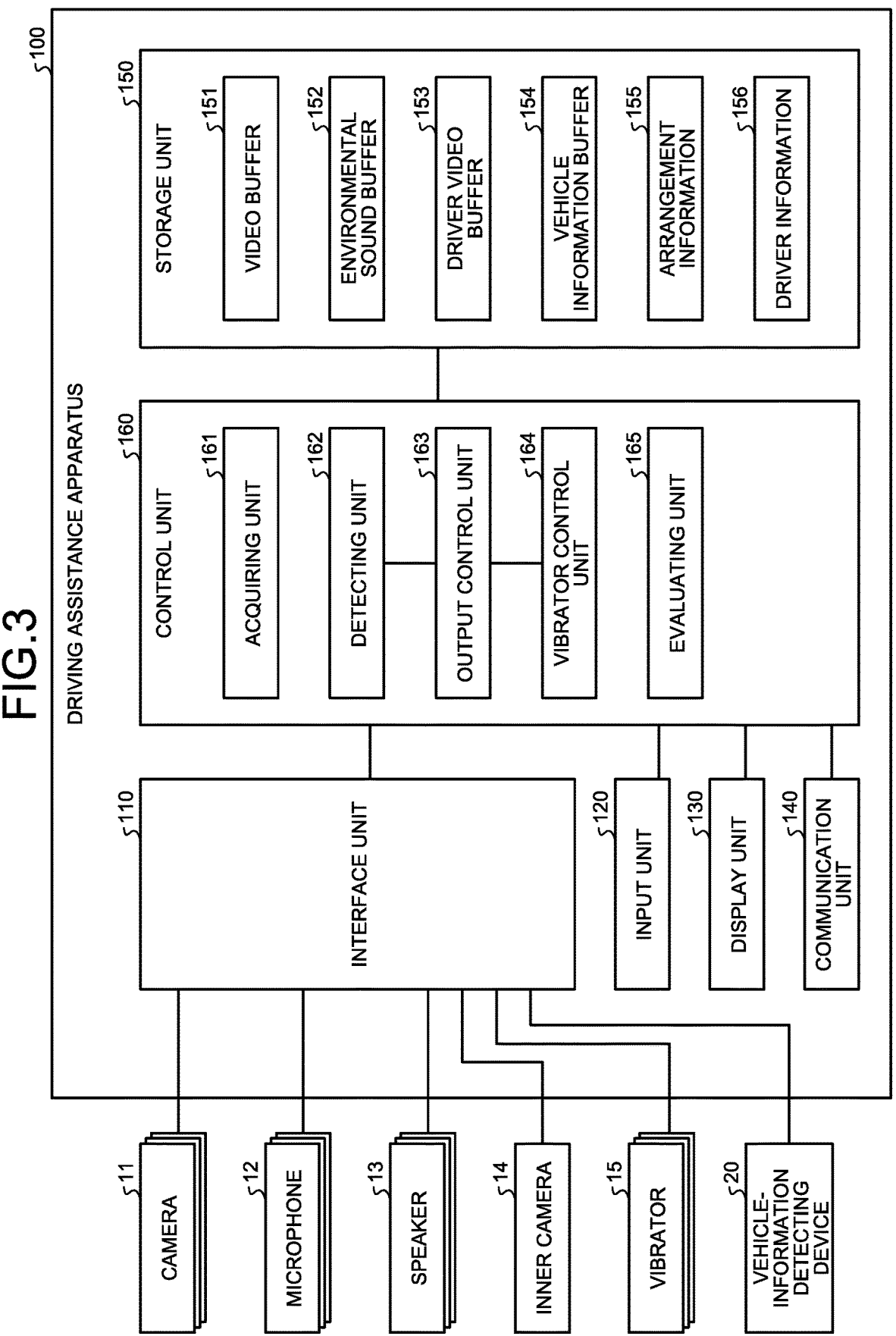

FIG.4

| CAMERA IDENTIFI-CATION INFORMATION | VIDEO INFORMATION |
|---|---|
| C1 (CAMERA 11a) | VIDEO INFORMATION TAKEN BY CAMERA 11a |
| C2 (CAMERA 11b) | VIDEO INFORMATION TAKEN BY CAMERA 11b |
| C3 (CAMERA 11c) | VIDEO INFORMATION TAKEN BY CAMERA 11c |
| C4 (CAMERA 11d) | VIDEO INFORMATION TAKEN BY CAMERA 11d |

FIG.5

| MICROPHONE IDENTIFI-CATION INFORMATION | ENVIRONMENTAL SOUND INFORMATION |
|---|---|
| M1 (MICROPHONE 12a) | ENVIRONMENTAL SOUND COLLECTED BY MICROPHONE 12a |
| M2 (MICROPHONE 12b) | ENVIRONMENTAL SOUND COLLECTED BY MICROPHONE 12b |
| M3 (MICROPHONE 12c) | ENVIRONMENTAL SOUND COLLECTED BY MICROPHONE 12c |
| M4 (MICROPHONE 12d) | ENVIRONMENTAL SOUND COLLECTED BY MICROPHONE 12d |

| CAMERA IDENTIFICATION INFORMATION | PARAMETER |
|---|---|
| C1 (CAMERA 11a) | PARAMETER OF CAMERA 11a |
| C2 (CAMERA 11b) | PARAMETER OF CAMERA 11b |
| C3 (CAMERA 11c) | PARAMETER OF CAMERA 11c |
| C4 (CAMERA 11d) | PARAMETER OF CAMERA 11d |

155a

| MICROPHONE IDENTIFICATION INFORMATION | POSITION COORDINATES |
|---|---|
| M1 (MICROPHONE 12a) | (xm1, ym1, zm1) |
| M2 (MICROPHONE 12b) | (xm2, ym2, zm2) |
| M3 (MICROPHONE 12c) | (xm3, ym3, zm3) |
| M4 (MICROPHONE 12d) | (xm4, ym4, zm4) |

155b

| SPEAKER IDENTIFICATION INFORMATION | POSITION COORDINATES |
|---|---|
| S1 (SPEAKER 13a) | (xs1, ys1, zs1) |
| S2 (SPEAKER 13b) | (xs2, ys2, zs2) |
| S3 (SPEAKER 13c) | (xs3, ys3, zs3) |
| S4 (SPEAKER 13d) | (xs4, ys4, zs4) |

155c

| PARAMETER |
|---|
| PARAMETER OF INNER CAMERA 14 |

155d

DRIVING ASSISTANCE APPARATUS, DRIVING ASSISTANCE METHOD, AND COMPUTER-READABLE RECORDING MEDIUM

CROSS-REFERENCE TO RELATED APPLICATION

This application is based upon and claims the benefit of priority of the prior Japanese Patent Application No. 2019-107394, filed on Jun. 7, 2019, the entire contents of which are incorporated herein by reference.

FIELD

The embodiments discussed herein are related to a driving assistance apparatus, and the like.

BACKGROUND

In recent years, to assist driving of a driver, various technologies are applied. For example, a related technique in which a speaker is mounted on a vehicle, and an alarm is output from the speaker when it is detected that an object approaches the vehicle to call attention of the driver has been available (for example, Japanese Laid-open Patent Publication Nos. 2009-259102, 2009-78628, 2005-316704, and 2018-41394).

In the related technique, an alarm is output each time an object approaches the vehicle. Therefore, the frequency of alarm output is high in a heavy traffic area, and pressure on the driver can be increased. Accordingly, in the related technique, there is a problem that risk notification is not achieved without putting pressure on the driver.

The above problem is not limited to cases of vehicles, but can occur similarly also when risk notification is performed to a subject aboard a mobile body, such as train, airplane, and motorcycle.

SUMMARY

According to an aspect of the embodiments, a driving assistance apparatus includes: a memory; and a processor coupled to the memory and configured to: detect a state of surroundings of a mobile body, and reduce, when an object is detected during when a stationary sound is continuously output to a subject by using a plurality of sound sources that are arranged around the subject aboard the mobile body, output of the stationary sound toward the subject from a direction in which the object is detected.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a functional block diagram illustrating a configuration of the driving assistance apparatus according to the first embodiment;

FIG. 4 illustrates an example of a data structure of a video buffer;

FIG. 5 illustrates an example of a data structure of an environmental sound buffer;

FIG. 6 illustrates an example of a data structure of arrangement information;

DESCRIPTION OF EMBODIMENTS

Preferred embodiments will be explained with reference to accompanying drawings. Note that these embodiments are not intended to limit the present invention.

[a] First Embodiment

Figure 1:
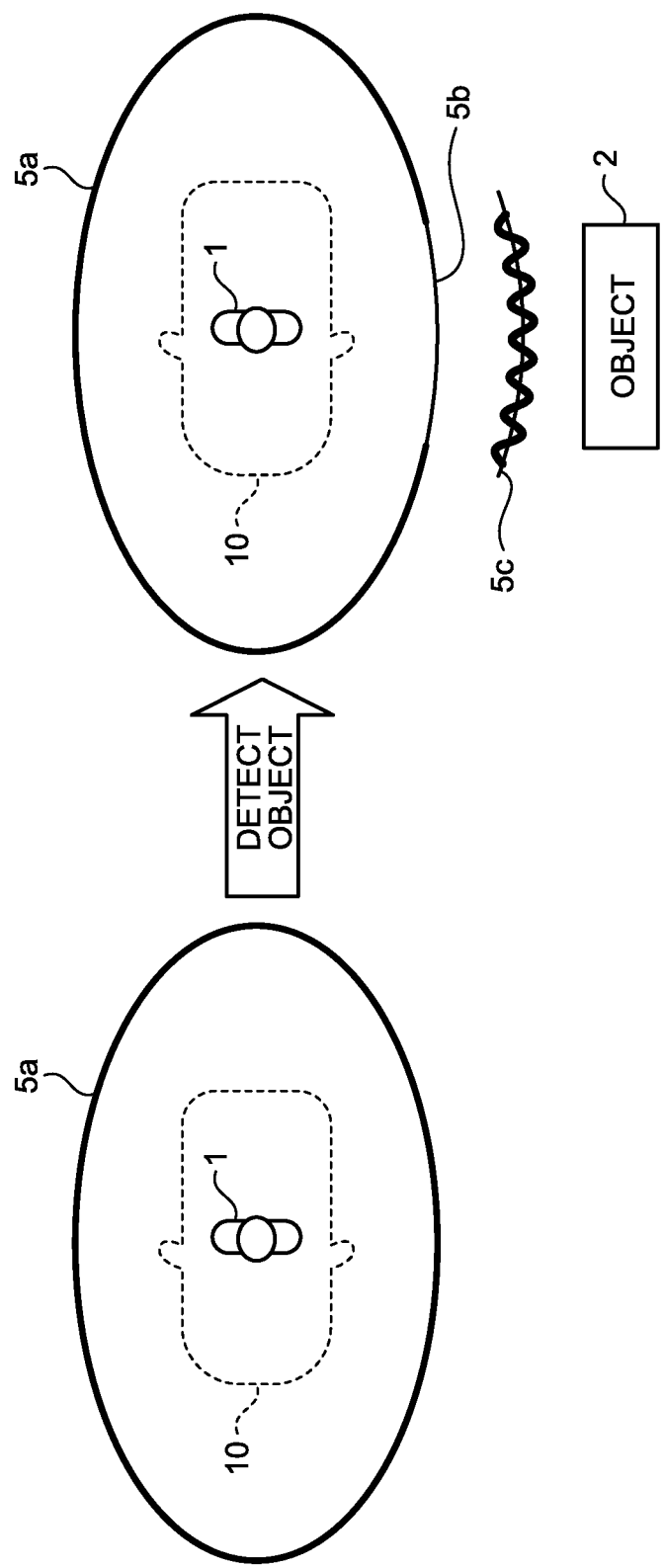
FIG. 1 is a diagram for explaining processing of a driving assistance apparatus according to a first embodiment.

FIG. 1 is a diagram for explaining processing of a driving assistance apparatus according to a first embodiment. The driving assistance apparatus according to the first embodiment outputs stationary sound, such as white noise, from plural speakers arranged around a driver 1 aboard a vehicle 10, and thereby creates a field 5*a* of the stationary sound around the driver 1.

The driving assistance apparatus detects a state of surroundings of the vehicle 10, and keeps outputting the stationary sound from plural microphones while any object is not detected in the surroundings of the vehicle 10, to maintain the field 5*a* of the stationary sound. The driving assistance apparatus attenuates (reduces), when an object 2 is detected in the surroundings of the vehicle 10, output of the stationary sound toward the driver 1 from the direction of the object 2, in the field 5*a* of the stationary sound.

By thus attenuating output of the stationary sound in a direction from the object 2 toward the driver 1, the driving assistance apparatus can make the driver 1 feel as if partial space 5*b* in the direction of the object 2 has suddenly become open from a state as if enclosed in closed space of a room. Furthermore, it is possible to naturally call attention of the driver 1 to the direction of the partial space 5*b*. That is, risk notification can be performed without putting pressure on a driver (subject) aboard of a mobile body, such as the vehicle 10.

Moreover, the driving assistance apparatus collects sound in the surroundings of the vehicle 10 by using a microphone arranged on an exterior of the vehicle 10. In the following description, sound collected by the microphone is denoted as "environmental sound". After detecting the object 2 in the surroundings of the vehicle 10 and attenuating the stationary sound toward the driver 1 from the direction of the object 2, the driving assistance apparatus outputs the environmental sound in the direction of the object 2, toward the driver 1 from the direction of the object 2.

By thus outputting the environmental sound in the direction of the object 2 from the direction of the object 2 in addition to attenuating the stationary sound, it is possible to call attention without giving strong stimulus by artificial alarm sound to the driver 1, using the environmental sound related to the object 2.

Figure 2:
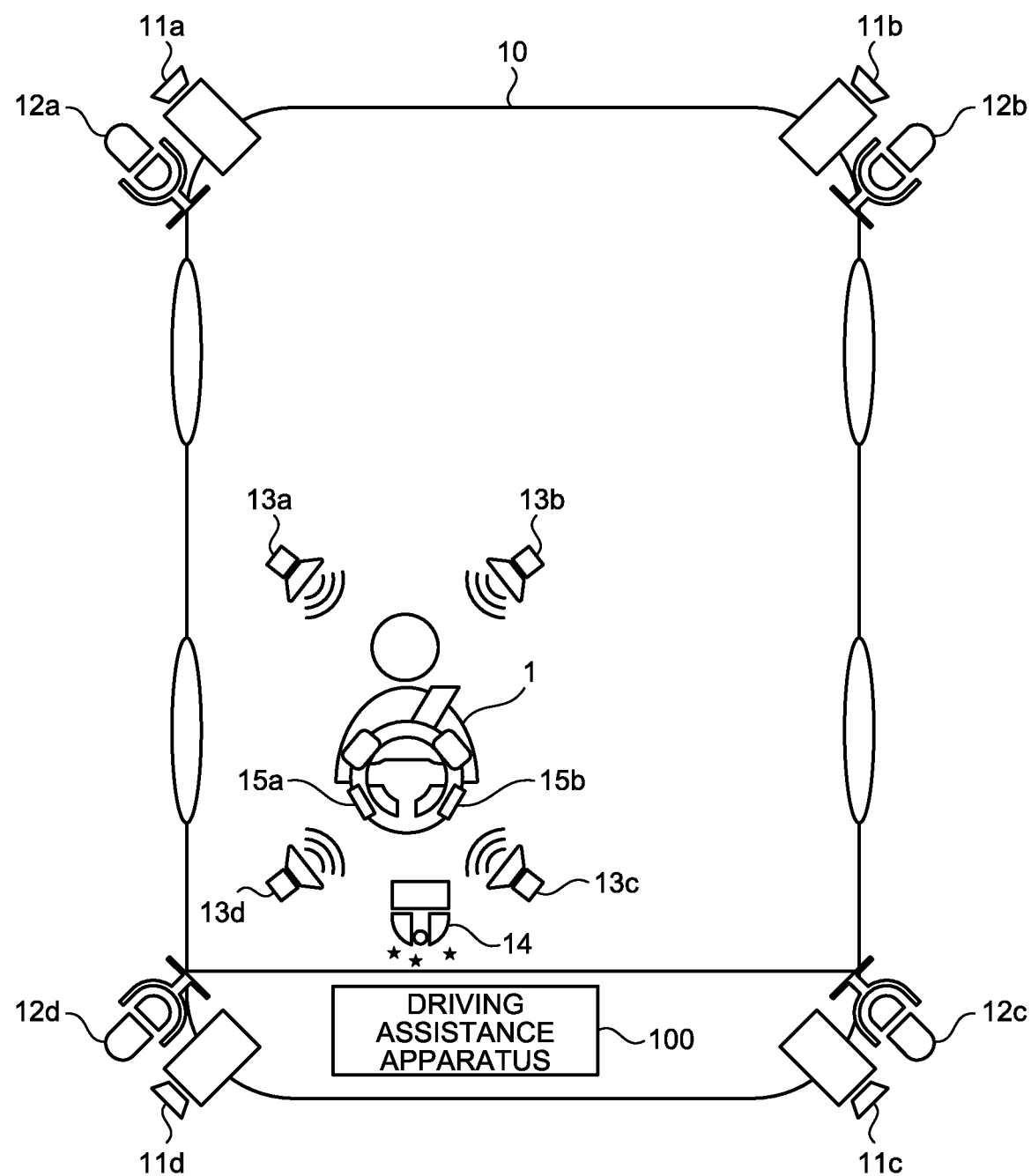
FIG. 2 illustrates an example of a driving assistance system according to the first embodiment.

Next, an example of a driving assistance system according to the first embodiment will be described. FIG. 2 illustrates an example of the driving assistance system according to the first embodiment. As illustrated in FIG. 2, in this driving assistance system, cameras 11a to 11d and microphones 12a to 12d are arranged in the vehicle 10. Around the driver 1 aboard at a driver's seat of the vehicle 10, plural speakers 13a to 14d and an inner camera 14 are arranged. Furthermore, on a steering wheel at the driver's seat, vibrators 15a, 15b are arranged. The microphones 12a to 12d are one example of a sound collecting device. The speakers 13a to 13d are one example of a sound source.

A driving assistance apparatus 100 is mounted on the vehicle 10, and is connected to each of the cameras 11a to 11d, the microphones 12a to 12d, the speakers 13a to 13d, the inner camera 14, and the vibrators 15a, 15b in a wireless manner or a wired manner.

The cameras 11a to 11d are cameras to take video around the vehicle 10. It is explained using the cameras 11a to 11d in this example, but another camera may be further used to take videos around the vehicle 10. The cameras 11a to 11d output information of the video taken thereby to the driving assistance apparatus 100. In the following description, the cameras 11a to 11d are denoted as camera 11 collectively. The information of the video taken by the camera 11 is denoted as "video information". The camera 11 may add camera identification information to uniquely identify the camera 11 to the video information.

The microphones 12a to 12d are microphones to collect environmental sound around the vehicle 10. It is explained using the microphones 12a to 12d in this example, but another microphone may be further used to collect environmental sound around the vehicle 10. The microphones 12a to 12d output information of the environmental sound collected thereby to the driving assistance apparatus 100. In the following description, the microphones 12a to 12d are denoted as microphone 12 collectively. The information of the environmental sound collected by the microphone 12 is denoted as "environmental sound information". The microphone 12 may add microphone identification information to uniquely identify the microphone 12 to the environmental sound information.

The speakers 13a to 13d are speakers that output the stationary sound, the environmental sound, and the like in accordance with a control command from the driving assistance apparatus 100. It is explained using the speakers 13a to 13d in this example, but another speaker may further be used to output the stationary sound, the environmental sound, and the like. In the following description, the speakers 13a to 13d are denoted as speaker 13 collectively.

The inner camera 14 is a camera that takes video of the driver 1. The inner camera 14 outputs information of the video of the driver 1 taken thereby to the driving assistance apparatus 100. In the following description, the information of images of the driver 1 is denoted as "driver video information".

The vibrators 15a, 15b are devices that give stimulus by vibration to the driver 1 in accordance with a control command from the driving assistance apparatus 100. The vibrators 15a, 15b may be arranged in the steering wheel as illustrated in FIG. 2, or may be arranged in a seat of the driver's seat. In the following description, the vibrators 15a, 15b are denoted as vibrator 15 collectively.

The driving assistance apparatus 100 is an apparatus that is mounted on the vehicle 10, and that performs processing described in FIG. 1. For example, the driving assistance apparatus 100 creates the field 5a of stationary sound by outputting stationary sound from the speaker 13. The driving assistance apparatus 100 detects a state of the surroundings of the vehicle 10 based on the video information received from the camera 11. When detecting an object while outputting the stationary sound from the speaker 13, the driving assistance apparatus 100 attenuates the output of the stationary sound toward the driver 1 from the direction of the object 2. Moreover, after attenuating the output of the stationary sound, the driving assistance apparatus 100 outputs, from the speaker 13, the environmental sound in a direction of the object based on the environmental sound information received from the microphone 12.

FIG. 3 is a functional block diagram illustrating a configuration of the driving assistance apparatus 100 according to the first embodiment. As illustrated in FIG. 3, the driving assistance apparatus 100 is connected to the camera 11 (cameras 11a to 11d), the microphone 12 (microphones 12a to 12d), the speaker 13 (13a to 13d), the inner camera 14, the vibrator 15 (15a, 15b), and a vehicle-information detecting device 20.

The vehicle-information detecting device 20 is a device that detects vehicle information, such as position information, speed information, acceleration information of the vehicle 10, whether brakes are applied, steering angle information of the steering wheel, and whether the engine of the vehicle 10 is started. The vehicle-information detecting device 20 outputs the vehicle information every certain time to the driving assistance apparatus 100.

For example, the vehicle-information detecting device 20 may detect the position information of the vehicle 10 by using a function of the global positioning system (GPS), or may detect the position information of the vehicle 10 by data communication with a base station in an adjacent area.

The vehicle-information detecting device 20 detects the speed information and the acceleration information of the vehicle 10 using a speed sensor (not illustrated) arranged in the vehicle 10. The vehicle-information detecting device 20 detects whether brakes are applied using a brake sensor (not illustrated) arranged in the vehicle 10. The vehicle-information detecting device 20 detects the steering angle information of the steering wheel using a steering sensor (not illustrated) arranged in the vehicle 10. The vehicle-information detecting device 20 detects whether the engine is started using a cam angle sensor (not illustrated). The vehicle-information detecting device 20 outputs the vehicle information to the driving assistance apparatus 100.

The driving assistance apparatus 100 includes an interface unit 110, an input unit 120, a display unit 130, a communication unit 140, a storage unit 150, and a control unit 160.

The interface unit 110 is connected to the camera 11, the microphone 12, the speaker 13, the inner camera 14, the vibrator 15, and the vehicle-information detecting device 20. The interface unit 110 outputs the video information acquired from the camera 11 to the control unit 160. The interface unit 110 outputs the environmental sound information acquired from the microphone 12 to the control unit 160. The interface unit 110 outputs the stationary sound acquired from the control unit 160 and a control command relating to output of the environmental sound, to the speaker 13. The interface unit 110 outputs the driver video information acquired from the inner camera 14 to the control unit 160. The interface unit 110 outputs a control command relating to vibration acquired from the control unit 160 to the vibrator 15. The interface unit 110 outputs the vehicle information acquired from the vehicle-information detecting device 20 to the control unit 160.

The input unit 120 is an input device to input various kinds of information to the driving assistance apparatus 100. For example, the input unit 120 corresponds to an input button, a touch panel, and the like.

The display unit 130 is a display device that displays various kinds of information output from the control unit 160. For example, the display unit 130 corresponds to a liquid crystal display, a touch panel, and the like.

The communication unit 140 is a processing unit that performs data communication with other devices through a network.

The storage unit 150 has a video buffer 151, an environmental sound buffer 152, a driver video buffer 153, a vehicle information buffer 154, an arrangement information 155, and a driver information 156. The storage unit 150 corresponds to a semiconductor memory device, such as a random access memory (RAM) and a flash memory, and a storage device, such as a hard disk drive (HDD).

The video buffer 151 is a buffer that stores video information of surroundings of the vehicle 10 taken by the camera 11. FIG. 4 illustrates an example of a data structure of the video buffer. As illustrated in FIG. 4, the video buffer 151 associates the camera identification information and the video information with each other. The camera identification information is information to uniquely identify the camera 11. For example, camera identification information C1 to C4 identify the cameras 11a to 11d, respectively.

The video information is video information that is taken by the camera 11. The video information includes image information (information of a still image) aligned in chronological order, and each image information is associated with time.

The environmental sound buffer 152 is a buffer that stores sound information that is collected by the microphone 12. FIG. 5 illustrates an example of a data structure of the environmental sound buffer. As illustrated in FIG. 5, the environmental sound buffer associates the microphone identification information and the environmental sound information with each other. The microphone identification information is information to uniquely identify the microphone 12. For example, microphone identification information M1 to M4 identify the microphones 12a to 12d, respectively.

The environmental information is environmental information collected by the microphone 12, and is, for example, information in which time, a signal intensity, a frequency, and the like are associated with one another.

The driver video buffer 153 is a buffer that stores driver video information taken by the inner camera 14. The driver video information includes pieces of image information aligned in chronological order. Each image information is associated with time.

The vehicle information buffer 154 is a buffer that stores vehicle information acquired from the vehicle-information detecting device 20. The vehicle information is associated with time. The vehicle information includes position information, speed information, acceleration information, whether brakes are applied, steering angle information of the steering wheel, and the like of the vehicle 10.

The arrangement information 155 is information that holds information about arranged positions of the camera 11, the microphone 12, the speaker 13, and the inner camera 14. FIG. 6 illustrates an example of a data structure of the arrangement information. As illustrated in FIG. 6, the arrangement information 155 has tables 155a, 155b, 155c, and 155d.

The table 155a has the camera identification information and parameters. The camera identification information is information to uniquely identify the camera 11. The parameters are an external parameter and an internal parameter to convert a coordinate point of an image taken by the camera 11 into a coordinate point (coordinate point relative to the "reference position" of the vehicle 10). A reference position of the vehicle 10 is pre-set. In the following description, coordinates based on the reference position of the vehicle 10 are described as "coordinates in the vehicle coordinate system".

The table 155b includes the microphone identification information and position coordinates. The microphone identification information is information to uniquely identify the microphone 12. The position coordinates indicate position coordinates of a microphone relative to the reference position.

The table 155c includes speaker identification information and position coordinates. The speaker identification information is information to uniquely identify the speaker 13. The position coordinates are position coordinates of the speaker 13 relative to the reference position.

The table 155d includes parameters of the inner camera 14. The parameters are the external parameter and the internal parameter to convert a coordinate point of an image taken by the inner camera 14 into a coordinate point relative to the reference position.

Returning back to explanation of FIG. 3, the driver information 156 is information that holds various kinds of information about the driver 1. For example, the driver information 156 includes years of driving experience, an evaluation value of driving skill, and the like of the driver 1.

The control unit 160 includes an acquiring unit 161, a detecting unit 162, an output control unit 163, a vibrator control unit 164, and an evaluating unit 165. The control unit 160 can be implemented by a central processing unit (CPU), a micro-processing unit (MPU), or the like. Moreover, the control unit 160 can be implemented by hardwired logic, such as an application specific integrated circuit (ASIC) and a field programmable gate array (FPGA).

The acquiring unit 161 is a processing unit that acquires various kinds of information from the camera 11, the microphone 12, the inner camera 14, and the vehicle-information detecting device 20 through the interface unit 110. The acquiring unit 161 acquires video information from the camera 11, and enters the video information in the video buffer 151, associating with the camera identification information.

The acquiring unit 161 acquires the environmental information from the microphone 12, and enters the environmental information in the environmental sound buffer 152, associating with the microphone identification information. The acquiring unit 161 acquires the driver video information from the inner camera 14, and enters it in the driver video buffer 153.

The detecting unit 162 is a processing unit that detects a state of the surroundings of the vehicle 10 based on the video information stored in the video buffer 151. The detecting unit 162 outputs a detection result to the output control unit 163 and the vibrator control unit 164. The detecting unit 162 may start the processing of detecting a state of the surroundings after the engine of the vehicle 10 is started, referring to the vehicle information buffer 154.

The detecting unit generates "front-side video information", "rear-side video information", "left-side video information", and "right-side video information" relative to the driver 1 based on the video information stored in the video buffer 151. For example, the detecting unit 162 generates the front-side video information by combining video on a right side out of image regions obtained by dividing an image region of the camera 11c into left and right two regions and video on a left side of image out of image regions obtained by dividing an image region of the camera 11d into left and right two regions. The detecting unit 162 generates the rear-side video information by combining video on a right side out of image regions obtained by dividing an image region of the camera 11a into left and right two regions and video on a left side of image out of image regions obtained by dividing an image region of the camera 11b into left and right two regions.

The detecting unit 162 generates the righty-side video information by combining video on a left side out of image regions obtained by dividing an image region of the camera 11a into left and right two regions and video on a right side of image out of image regions obtained by dividing an image region of the camera 11d into left and right two regions. The detecting unit 162 generates the left-side video information by combining video on a right side out of image regions obtained by dividing an image region of the camera 11b into left and right two regions and video on a left side of image out of image regions obtained by dividing an image region of the camera 11c into left and right two regions. The detecting unit 162 may Generate video information of the front side, the rear side, the left side, and the right side by using other common techniques.

The detecting unit 162 generates an edge image by subjecting the respective image information aligned in chronological order in the front-side video information to the Hough transform, and the like, and compares the edge image with a template in which a shape of each type of object is defined, to detect whether an object is present in a front direction. When detecting an object, the detecting unit 162 identifies center coordinates of the object, and converts the identified center coordinates into coordinates in a vehicle coordinate system based on parameters of the cameras 11c, 11d. The detecting unit 162 outputs information of a detection result in which the direction "front side" and the coordinates in the vehicle coordinate system of the object are associated with each other, to the output control unit 163 and the vibrator control unit 164.

The detecting unit 162 generates an edge image by subjecting the respective image information aligned in chronological order in the rear-side video information to the Hough transform and the like, and compares the edge image with the template in which a shape of each object is defined, to detect whether an object is present in a rear direction. When detecting an object, the detecting unit 162 identifies center coordinates of the object, and converts the identified center coordinates into coordinates in the vehicle coordinate system based on parameters of the cameras 11a, 11b. The detecting unit 162 outputs information of a detection result in which the direction "rear side" and the coordinates in the vehicle coordinate system of the object are associated with each other, to the output control unit 163 and the vibrator control unit 164.

The detecting unit 162 generates an edge image subjecting the respective image information aligned in chronological order in the left-side video information to the Hough transform and the like, and compares the edge image with the template in which a shape of each object is defined, to detect whether an object is present in a leftward direction. When detecting an object, the detecting unit 162 identifies center coordinates of the object, and converts the identified center coordinates into coordinates in the vehicle coordinate system based on parameters of the cameras 11b, 11c. The detecting unit 162 outputs information of a detection result in which the direction "left side" and the coordinates in the vehicle coordinate system of the object are associated with each other, to the output control unit. 163 and the vibrator control unit 164.

The detecting unit 162 generates an edge image by subjecting the respective image information aligned in chronological order in the right-side video information to the Hough transform and the like, and compares the edge image with the template in which a shape of each object is defined, to detect whether an object is present in a rightward direction. When detecting an object, the detecting unit 162 identifies center coordinates of the object, and converts the identified center coordinates into coordinate in the vehicle coordinate system based on parameters of the cameras 11a, 11d. The detecting unit 162 outputs information of a detection result in which the direction "right side" and the coordinates in the vehicle coordinate system of the object are associated with each other, to the output control unit 163 and the vibrator control unit 164.

While an object has not been detected in any of the video information of the "front-side video information", the "rear-side video information", the "left-side video information" and the "right-side video information", the detecting unit 162 outputs a detection result indicating that an object is not detected, to the output control unit 163 and the vibrator control unit 164.

The output control unit 163 is a processing unit that performs control of stationary sound output, and control of environmental sound output with respect to the speaker 13. The output control unit 163 refers to the vehicle information buffer 154, and determines whether the engine of the vehicle 10 is started. The output control unit 163 creates, when the engine of the vehicle 10 is started, a field of the stationary sound by using the speaker 13. For example, the output control unit 163 controls the speaker 13 such that uniform stationary sound is heard from around the driver 1 by using a stereophonic technique, to create a field of the stationary sound. The output control unit 163 uses white noise as the stationary sound. The output control unit 163 may output startup sound surrounding the driver 1 from the speaker 13 before creating the field of the stationary sound.

The output control unit 163 acquires the detection result of the detecting unit 162, and maintains a predetermined volume (sound level set in advance) of the stationary sound output from each of the speaker 13 while an object is not detected, to maintain the field of the stationary sound.

On the other hand, when an object is detected, the output control unit 163 acquires the detection result from the detecting unit 162, and controls to reduce the output of the stationary sound toward the driver 1 from a direction in which the object is detected. By performing this control by the output control unit 163, it is possible to give a feeling as if a window in the direction in which the object is detected is open, to the driver 1.

Figure 7:
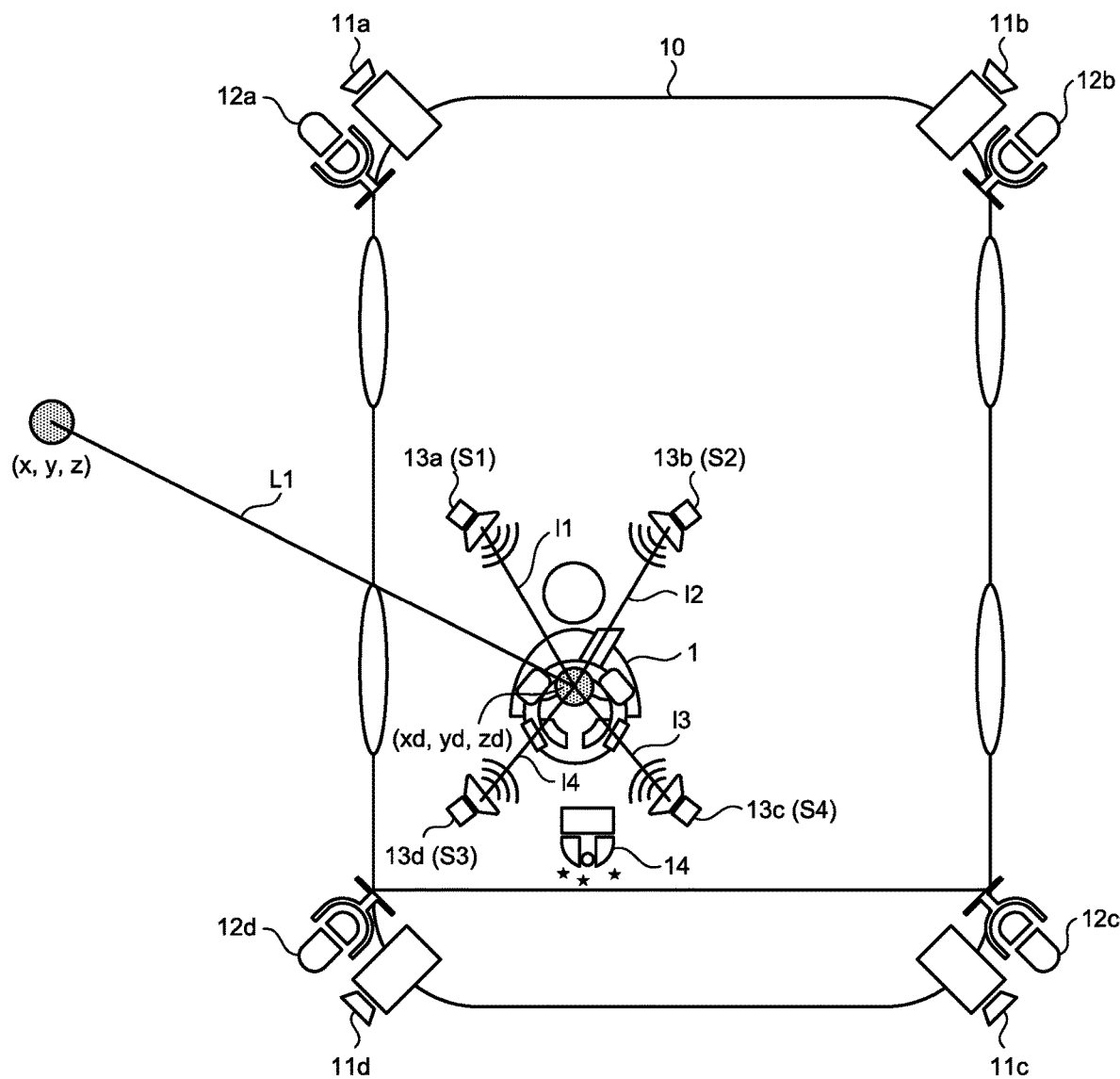
FIG. 7 is a diagram for explaining an example of processing of an output control unit.

FIG. 7 is a diagram for explaining an example of processing performed by the output control unit. As illustrated in FIG. 7, it is supposed that an object is detected at a position (x, y, z), and the driver 1 is positioned at a position (xd, yd, zd). The output control unit 163 identifies a line segment L1 that connects the position (x, y, z) and the position (xd, yd, zd). The output control unit 163 identifies line segments connecting positions of the respective speakers 13a to 13d, and the position (xd, yd, zd) based on the arrangement information 155.

For example, a line segment connecting the position of the speaker 13a and the position (xd, yd, zd) is l1. A line segment connecting the position of the speaker 13b and the position (xd, yd, zd) is l2. A line segment connecting the position of the speaker 13c and the position (xd, yd, zd) is l3. A line segment connecting the position of the speaker 13d and the position (xd, yd, zd) is l4.

The output control unit 163 sorts the speaker 13 (speaker identification information S1 to S4 of the speaker 13) in ascending order of angle, based on an angle formed between the line segment L1 and the respective line segments 11 to 14. For example, in the example illustrated in FIG. 7, the output control unit 163 sorts the speakers in order of the speakers 13a, (S1), 13d (S4), 13b (S2), 13c (S3). The output control unit 163 performs a control to attenuate the volume of the stationary sound output from a speaker corresponding to the speaker identification information at the top among sorted S1 to S4. Thus, the output control unit 163 reduces the output of the stationary sound toward the driver 1 from the direction in which the object is detected in the field of the stationary sound.

For example, in the example illustrated in FIG. 7, the output control unit 163 increases the attenuation amount of the stationary sound to be output in order of the speaker 13a, the speaker 13d, the speaker 13b, and the speaker 13c.

After reducing the output of the stationary sound by the above processing, the output control unit 163 performs processing of outputting environmental sound of the direction in which the object is detected from the speaker 13 in the direction in which the object is detected. For example, the output control unit 163 compares the position of the object with the position of the microphone 12 at the time when the object is detected, to identify the microphone closest to the position of the object. The output control unit 163 acquires environmental sound information in a predetermined time period prior to and subsequent to a time when the object is detected, from the environmental sound buffer 152, to output from the speaker 13 positioned in the direction in which the object is detected.

For example, in FIG. 7, the microphone closest to the position of the object corresponds the microphone 12a, and the speaker in the direction in which the object is detected corresponds to the speakers 13a, 13d. The output control unit 163 outputs the environmental sound information in a predetermined time period prior to and subsequent to the time when the object is detected out of the environmental sound information collected by the microphone 12a, from the speaker 13a in a first volume, and from the speaker 13d in a second volume. For example, the output control unit 163 sets the first volume of the speaker 13a closer to the direction of the object larger than the second volume of the speaker 13d.

The output control unit 163 determines whether the driver 1 is an experienced driver by referring to the driver information 156. The output control unit 163 determines that the driver 1 is an experienced driver when an evaluation value of the driver information 156 is equal to or higher than a predetermined evaluation value. At the time when an object is detected and the output of the stationary sound is to be attenuated, the output control unit 163 decreases the attenuation amount of the output, of the stationary sound when the driver 1 is an experienced driver.

Figure 8:
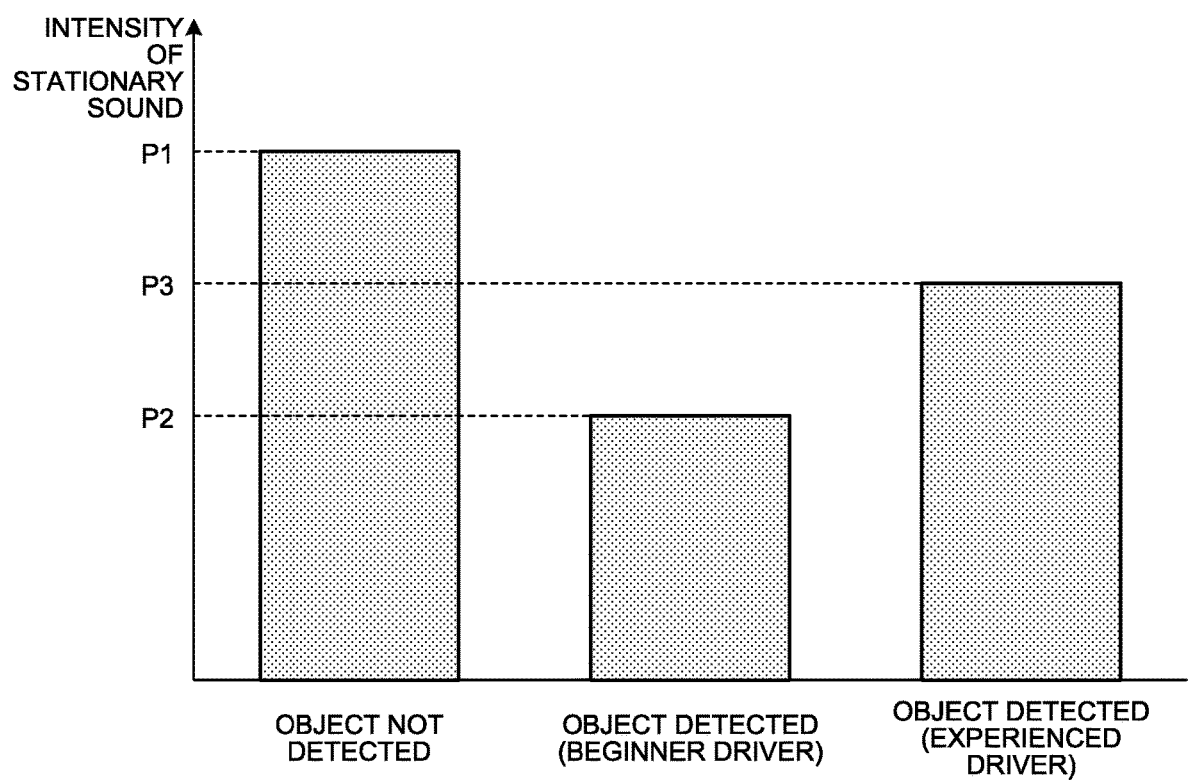
FIG. 8 is a diagram for explaining an attenuation amount of stationary sound.

FIG. 8 is a diagram for explaining an attenuation amount of the stationary sound. For example, during when an object is not detected, the intensity of the stationary sound to be output from the speaker 13 is P1. When an object is detected and the driver 1 is not an experienced driver (beginner driver), the intensity of the stationary sound subjected to attenuation is P2. When an object is detected and the driver 1 is an experienced driver, the intensity of the stationary sound subjected to attenuation is P3. As described above, by making a difference between before and after attenuation small when the driver 1 is an experienced driver, the pressure on the driver 1 can be reduced.

After performing the processing of attenuating the stationary sound and the processing of outputting the environmental sound described above, the output control unit 163 determines whether the driver 1 has recognized the object (risk) based on the driver video information of the driver video buffer 153. When the driver 1 has recognized the object, the output control unit 163 outputs a control command to the speaker 13 to perform processing of returning back to the original stationary sound from the attenuated stationary sound.

For example, the output control unit 163 analyzes the driver video information to detect a direction of a line of sight of the driver 1. The output control unit 163 determines that the driver 1 has recognized the object when a line of sight of the driver 1 is directed to the direction of the detected object. The output control unit 163 may determine whether the driver has recognized the object by using other determination policies.

Returning back to explanation of FIG. 3, the vibrator control unit 164 is a processing unit that vibrates the vibrator 15 based on a detection result of the detecting unit 162. The vibrator control unit 164 suppresses vibration of the vibrator 15 while an object is not detected by the detecting unit 162.

The vibrator control unit 164 vibrates the vibrator 15a when an object is detected in a rightward direction of the vehicle 10. The vibrator control unit 164 vibrates the vibrator 15b when an object is detected in a leftward direction of the vehicle 10. The vibrator control unit 164 vibrates the vibrators 15a, 15b when an object is detected in a rearward direction of the vehicle 10. The vibrator control unit 164 may control vibration of the vibrator 15 by using other control policies.

The evaluating unit 165 is a processing unit that evaluates the driver 1 that drives the vehicle 10. The evaluating unit 165 enters an evaluation result in the driver information 156. The evaluating unit 165 refers to the driver video information in the driver video buffer 153, and compares movement of the driver 1 and movement policies conforming to safe driving, to calculate an evaluation value of the driver 1. For example, the evaluating unit 165 detects a direction of a line of sight of a face image of the driver 1 when the engine is started, and adds a point to the evaluation value if the driver 1 is looking around. On the other hand, the evaluating unit 165 deducts a point from the evaluation value if the driver 1 is not looking around when the engine is started. Moreover, the evaluating unit 165 refers to the speed information in the vehicle information buffer 154, and deducts a point from the evaluation value when the speed of the vehicle 10 exceeds a legal speed.

The evaluating unit 165 updates the evaluation value of the driver 1 based on evaluation items relating to behavior of the driver 1 or the vehicle 10, and evaluation policies associated with point addition or point deduction. The evaluating unit 165 may add points to or deduct points from the evaluation value based on a driving history of the driver 1 or information of a driver's license. For example, points are added to the evaluation value when the driving history of the driver 1 is equal to or longer than predetermined years. The evaluating unit 165 may deduct a point from the evaluation value each time the penalty point increases, based on the information of the driver's license.

Figure 9:
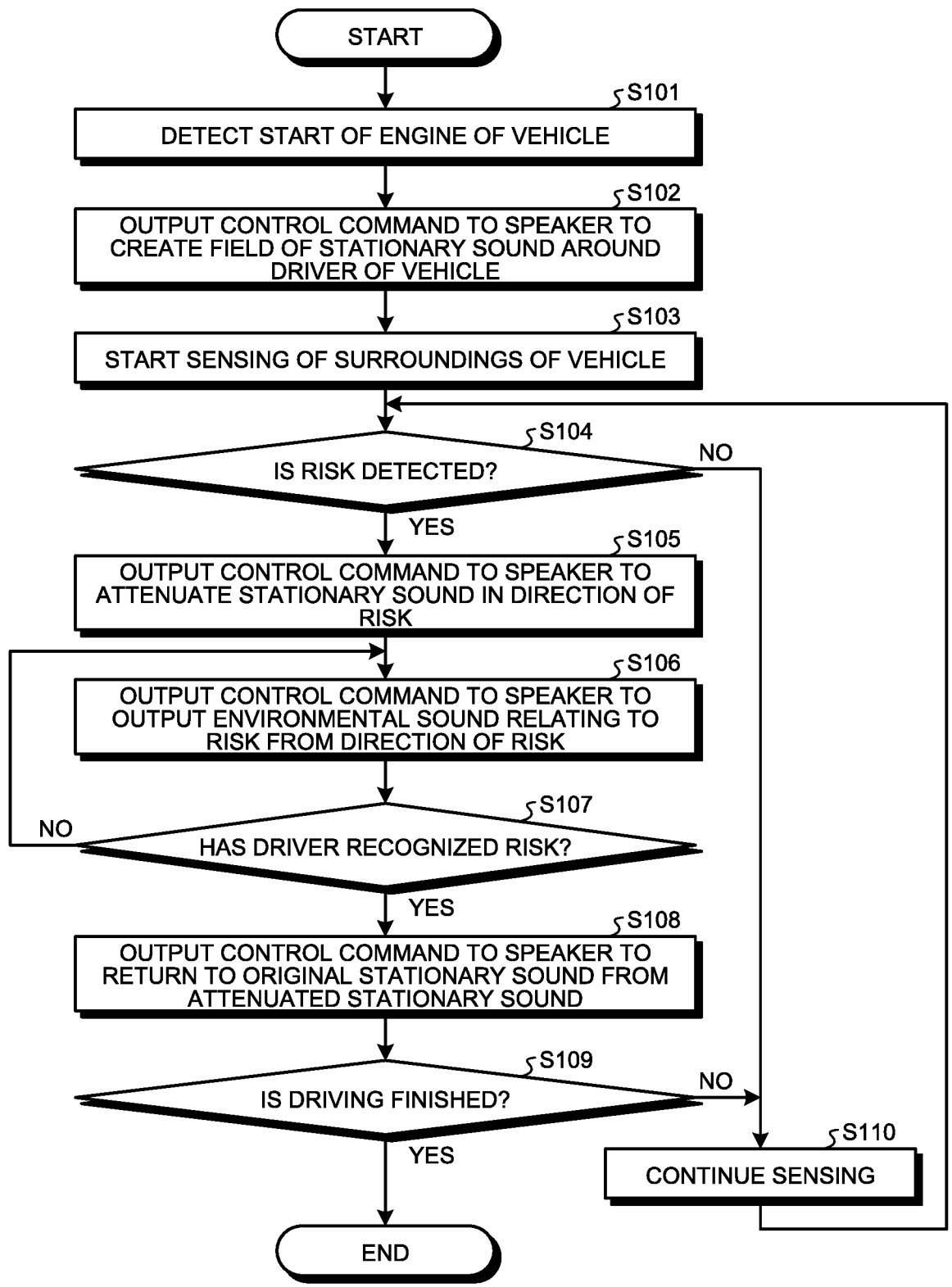
FIG. 9 is a flowchart of processing procedures of the driving assistance apparatus according to the first embodiment.

Next, an example of processing procedures of the driving assistance apparatus 100 according to the first embodiment will be described. FIG. 9 is a flowchart of processing procedures of the driving assistance apparatus according to the first embodiment. The output control unit 163 of the driving assistance apparatus 100 detects start of the engine of the vehicle 10 (step S101). The output control unit 163 outputs a control command to the speaker 13, to create a field of the stationary sound around the driver 1 of the vehicle 10 (step S102).

The detecting unit 162 of the driving assistance apparatus 100 starts sensing for the surroundings of the vehicle 10 (step S103). The detecting unit 162 shifts to step S110 when any risk (object) is not detected (step S104: NO).

On the other hand, when the detecting unit 162 detects a risk (step S104, YES), the output control unit 163 outputs a control command to the speaker 13 to attenuate the stationary sound in a direction of the risk (step S105). The output control unit 163 outputs a control command to the speaker 13 to output the environmental sound relating to the risk from the direction of the risk (step S106).

The output control unit 163 determines whether the driver 1 has recognized the risk (step S107). When the driver 1 has not recognized the risk (step S107: NO), the output control unit 163 shifts to step S106. On the other hand, when the driver 1 has recognized the risk (step S107: YES), the output control unit 163 shifts to step S108.

The output control unit 163 outputs a control command to the speaker 13 to return to the original stationary sound from the attenuated stationary sound (step S108). When driving is finished (step S109: YES), the driving assistance apparatus 100 ends the processing. On the other hand, when driving is not finished (step S109: NO), the driving assistance apparatus 100 continues sensing (step S110), and shifts to step S104.

Next, an effect of the driving assistance apparatus 100 according to the first embodiment will be described. The driving assistance apparatus 100 detects a state of surroundings of the vehicle 10, and maintains the field 5a of the stationary sound by keeping outputting the stationary sound from the microphones while an object is not detected in the surroundings of the vehicle 10. When an object is detected in the surroundings of the vehicle 10, the driving assistance apparatus 100 attenuates output of the stationary sound toward the driver 1 from the object in the field of the stationary sound. Thus, it is possible to notify of a risk without giving pressure on the driver (subject) aboard on a mobile body, such as the vehicle 10.

Moreover, by attenuating the output of the stationary sound toward the driver 1 from the object, the driving assistance apparatus 100 can make the driver 1 feel as if partial space in the direction of the object suddenly opens from a state as if being in closed space of a room. Furthermore, it is possible to call attention of the driver 1 to the direction of the partial space in a natural manner.

The driving assistance apparatus 100 collects sound in surroundings of the vehicle 10 by using the microphone 12 arranged on an exterior of the vehicle 10. The driving assistance apparatus 100 detects an object in the surroundings of the vehicle 10, and outputs the environmental sound in the direction of the object toward the driver 1 after attenuating output of the stationary sound toward the driver 1 from the object.

As described, by outputting the environmental sound in the direction of the object from the direction of an object in addition to attenuation of the stationary sound, it is possible to call attention without giving strong stimulus by artificial alarm sound to the driver 1, using the environmental sound related to the object.

Furthermore, according to the driving assistance apparatus 100, by performing notification using sound and senses (variation of the stationary sound, environmental sound) to utilize the innate ability of human to sense the environment, safe driving not dependent on information but by senses can be achieved. That is, the "AFFECTIVE Mobility" in which the boundary between human and vehicle disappears, and sense are expanded with unification can be realized.

[b] Second Embodiment

Next, a driving assistance apparatus according to a second embodiment will be described. The driving assistance apparatus according to the second embodiment creates a field of stationary sound similarly to the driving assistance apparatus 100 of the first embodiment. The driving assistance apparatus according to the second embodiment acquires traffic conditions around a vehicle, and attenuates the stationary sound in a frontward direction of the driver 1 when a road ahead is open. As described, by attenuating the stationary sound in in the frontward direction, it is possible to give a sense of openness to the driver 1, and to create a sense of speed higher than the actual speed. Therefore, it is possible to deter the driver 1 from increasing the driving speed of a vehicle.

Moreover, the driving assistance apparatus according to the second embodiment acquires the traffic conditions around the vehicle, and adds fluctuations to the stationary sound in the frontward direction when there is a traffic jam ahead. Thus, it is possible to make the driver 1 sense a risk, and to deter from increasing driving speed of the vehicle.

Figure 10:
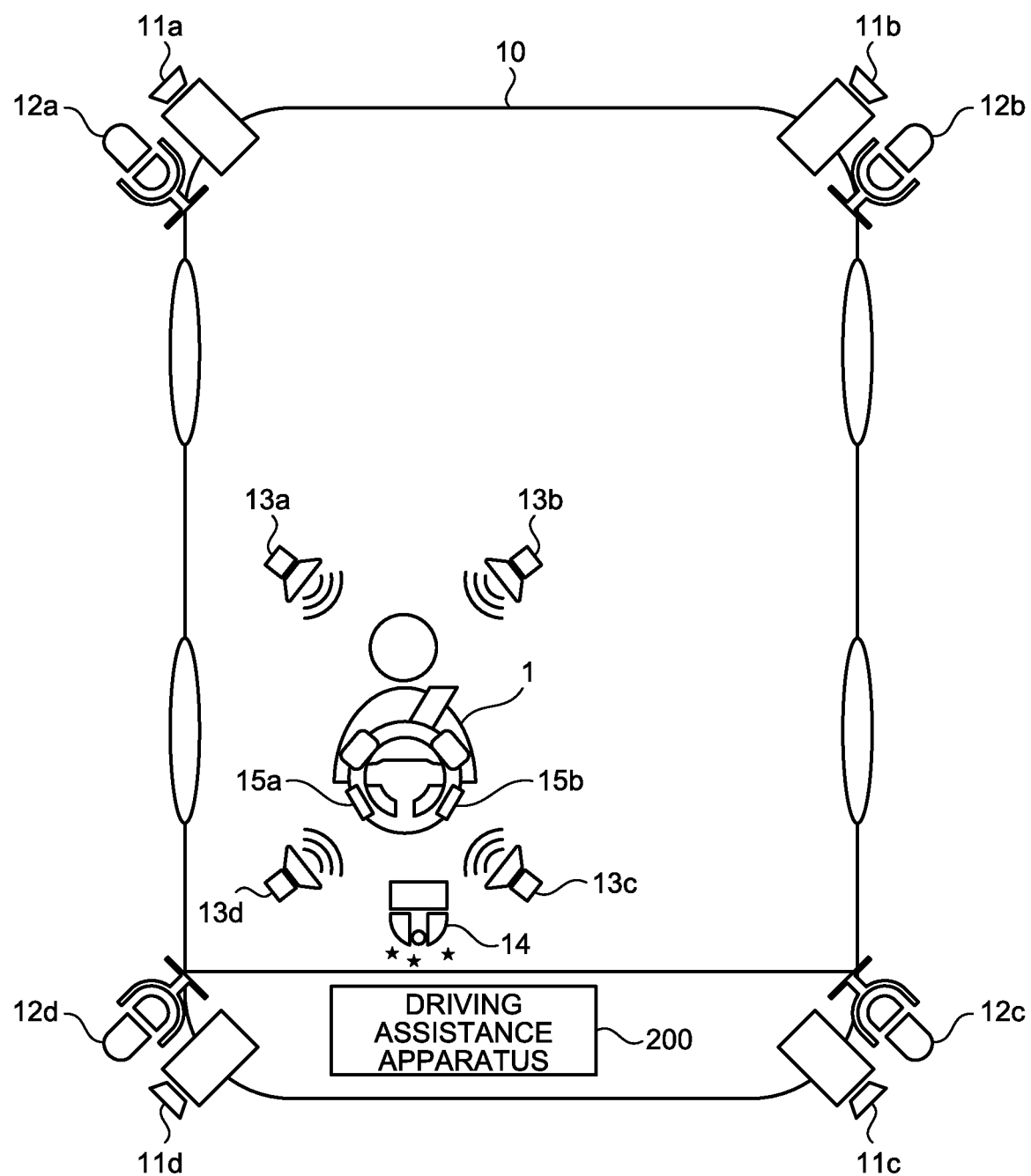
FIG. 10 illustrates an example of a driving assistance system according to a second embodiment.

FIG. 10 illustrates an example of a driving assistance system according to the second embodiment. As illustrated in FIG. 10, in this driving assistance system, the camera 11 and the microphone 12 are arranged on the vehicle 10. Around the driver 1 on the driving seat of the vehicle 10, the speaker 13 and the inner camera 14 are arranged. Furthermore, the vibrator 15 is arranged in the steering wheel at the driver's seat. Descriptions about the camera 11, the microphone 12, the speaker 13, the inner camera 14, and the vibrator 15 are the same as those of the first embodiment.

A driving assistance apparatus 200 is mounted on the vehicle 10, and is connected to each of the camera 11, the microphone 12, the speaker 13, the inner camera 14, and the vibrator 15 in a wireless manner or a wired manner.

Figure 11:
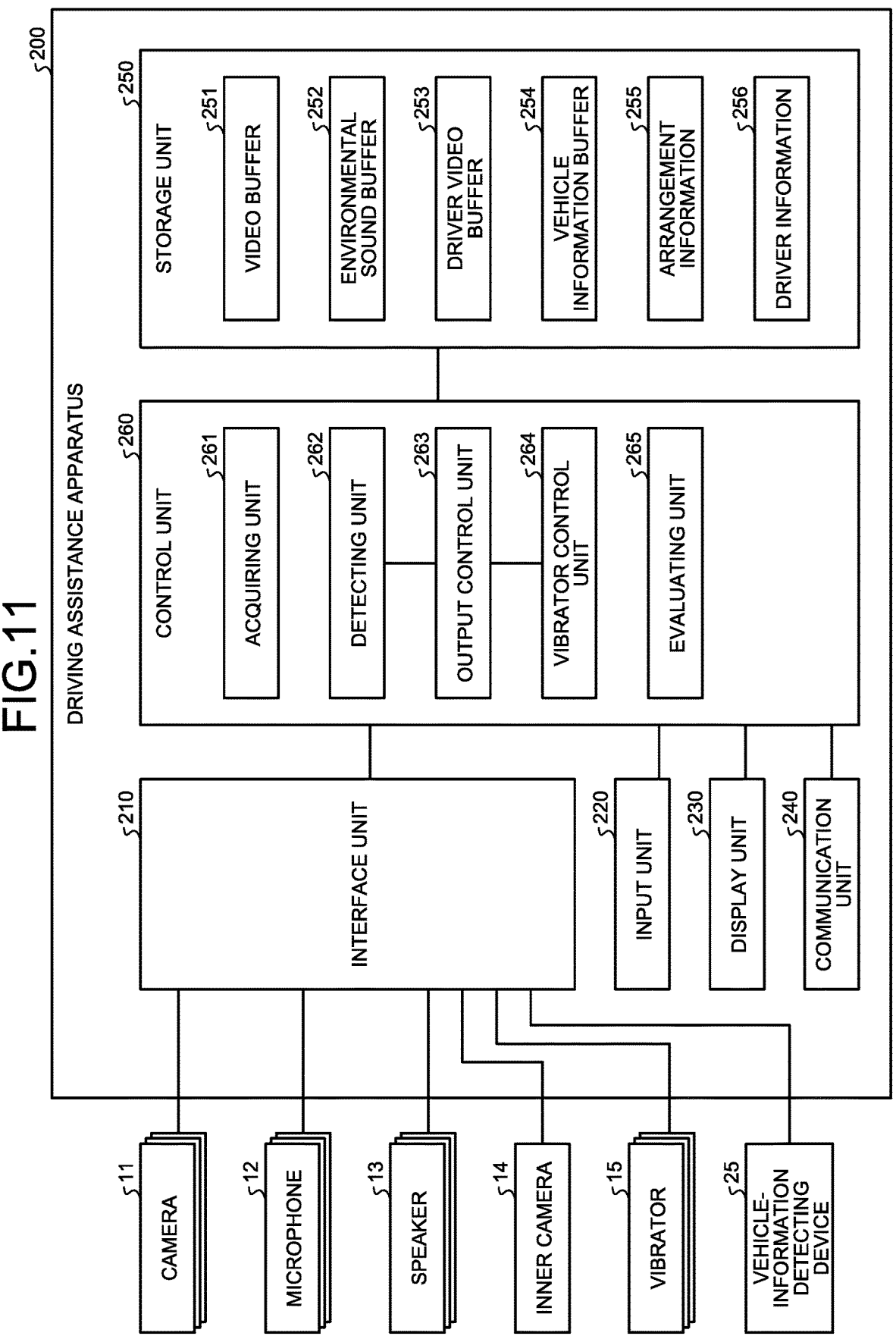
FIG. 11 is a functional block diagram illustrating a configuration of a driving assistance apparatus according to the second embodiment.

FIG. 11 is a functional block diagram illustrating a configuration of a driving assistance apparatus according to the second embodiment. As illustrated in FIG. 11, the driving assistance apparatus 100 is connected to the camera 11 (cameras 11a to 11d), the microphone 12 (microphones 12a to 12d), the speaker 13 (13a to 13d), the inner camera 14, the vibrator 15 (15a, 15b), and a vehicle-information detecting device 25.

The vehicle-information detecting device 25 is a device that detects vehicle information, such as position information, speed information of the vehicle 10, whether brakes are applied, steering angle information of the steering wheel, and whether the engine of the vehicle 10 is started. Moreover, the vehicle-information detecting device 25 accesses a server on a network, and acquires information about traffic conditions around the vehicle 10. For example, the vehicle-information detecting device 25 provides the position information of the vehicle 10 to the server, to acquire information about traffic conditions ahead of the vehicle 10, and outputs it to a control unit 260.

The driving assistance apparatus 200 includes an interface unit 210, an input unit 220, a display unit 230, a communication unit 240, a storage unit 250, and a control unit 260.

The interface unit 210 is connected to the camera 11, the microphone 12, the speaker 13, the inner camera 14, the vibrator 15, and the vehicle-information detecting device 25. The interface unit 210 outputs the video information acquired from the camera 11 to the control unit 260. The interface unit 210 outputs the environmental information acquired from the microphone 12 to the control unit 260. The interface unit 210 outputs a control command from the control unit 260 relating to output of the stationary sound and the environmental sound, to the speaker 13. The interface unit 210 outputs the driver video information acquired from an inner camera 24 to the control unit 260. The interface unit 210 outputs a control command from the control unit 260 relating to vibration, to the vibrator 15. The interface unit 210 outputs the vehicle information acquired from the vehicle-information detecting device 25 to the control unit 260.

Descriptions about the input unit 220, the display unit 230, and the communication unit 240 are the same as the descriptions about the input unit 120, the display unit 130, and the communication unit 140 of the first embodiment.

The storage unit 250 includes a video buffer 251, an environmental sound buffer 252, a driver video buffer 253, a vehicle information buffer 254, arrangement information 255, and driver information 256. The storage unit 250 corresponds to a storage device of a semiconductor memory device, such as a RAM and a flash memory, an HDD, and the like.

Descriptions about the video buffer 251, the environmental sound buffer 252, the driver video buffer 253, the arrangement information 255, and the driver information 256 are the same as the descriptions about the video buffer 151, the environmental sound buffer 152, the driver video buffer 153, the arrangement information 155, and the driver information 156 of the first embodiment.

The vehicle information buffer 254 is a buffer that stores vehicle information that is acquired from the vehicle-information detecting device 25. The vehicle information is associated with a time. The vehicle information includes position information, speed information, whether brakes are applied, steering angle of the steering wheel, and the like of the vehicle 10. Moreover, the vehicle information includes information on traffic conditions ahead of the vehicle 10. The information of traffic conditions includes information indicating whether there is a traffic jam.

The control unit 260 includes an acquiring unit 261, a detecting unit 262, an output control unit 263, a vibrator control unit 264, and an evaluating unit 265. The control unit 260 can be implemented by a CPU, an MPU, or the like. Furthermore, the control unit 260 can be implemented by hardwired logic, such as an ASIC and an FPGA.

The acquiring unit 261 is a processing unit that acquires various kinds of information from a camera 21, a microphone 22, the inner camera 24, and the vehicle-information detecting device 25 through the interface unit 210. Other descriptions about the acquiring unit 261 are the same as the descriptions about the acquiring unit 161 of the first embodiment.

The detecting unit 262 is a processing unit that detects a state in surroundings of the vehicle 10 based on the video information stored in the video buffer 251. The detecting unit 262 outputs a detection result to the output control unit 263 and the vibrator control unit 264. Other descriptions about the detecting unit 262 are the same as the descriptions about the detecting unit 162 of the first embodiment.

The output control unit 263 is a processing unit that performs output control of the stationary sound and output control of the environmental sound with respect to the speaker 13. The output control unit 263 refers to the vehicle information buffer 254, and determines whether the engine of the vehicle 10 is started. The output control unit 263 creates a field of the stationary sound by using the speaker 13 when the engine of the vehicle 10 is started. The processing performed by the output control unit 263 of creating the field of the stationary sound is the same as that of the output control unit 163 of the first embodiment.

The output control unit 263 acquires information about traffic conditions from the vehicle information buffer 254, and determines whether there is a traffic jam ahead of the vehicle 10. Moreover, the output control unit 263 acquires a detection result from the detecting unit 262, and determines whether an object is detected in a frontward direction. The output control unit 263 determines that the "road ahead is open" when there is no traffic jam ahead, and when an object is not detected in a frontward direction.

When determining that the road ahead is open, the output control unit 263 controls to attenuate the stationary sound output from the speakers 13c, 13d in the frontward direction of the driver 1. By performing this control by the output control unit 263, it is possible to give a sense of openness in a forward direction for the driver 1.

Furthermore, when determining that the road ahead is open, the output control unit 263 generates a display screen indicating precautions for speeding for the driver 1, to output to the display unit 230, and thereby deters the driver 1 from increasing the speed.

On the other hand, when determining that an object is not present in a frontward direction, but there is a traffic jam ahead, the output control unit 263 controls to add fluctuations to the stationary sound to output from the speakers 13c, 13d in the frontward direction of the driver 1. For example, a case in which an object is not present in a range detectable by the cameras 11c, 11d, but there is a traffic jam outside the range detectable by the cameras 11c, 11d is assumed.

By performing this control by the output control unit 263, it is possible to make the driver 1 sense a risk, and to deter from increasing the driving speed of the vehicle. The output control unit 263 continues the control of adding fluctuations to the stationary sound during when there is a traffic jam ahead.

In addition to the above processing, the output control unit 263 may perform processing similar to that of the output control unit 163 described in the first embodiment. That is, the output control unit 263 acquires a detection result from the detecting unit 162, and when an object is detected, controls to reduce the output of the stationary sound toward the driver 1 from the direction in which the object is detected.

The vibrator control unit 264 is a processing unit that vibrates the vibrator 15 based on a detection result of the detecting unit 262. Other descriptions about the vibrator control unit 264 are the same as those of the vibrator control unit 164 of the first embodiment.

The evaluating unit 265 is a processing unit that evaluates the driver 1 driving the vehicle 10. The evaluating unit 265 enters an evaluation result in the driver information 256. Other descriptions about the evaluating unit 265 are the same as those of the evaluating unit 165 of the first embodiment.

Figure 12:
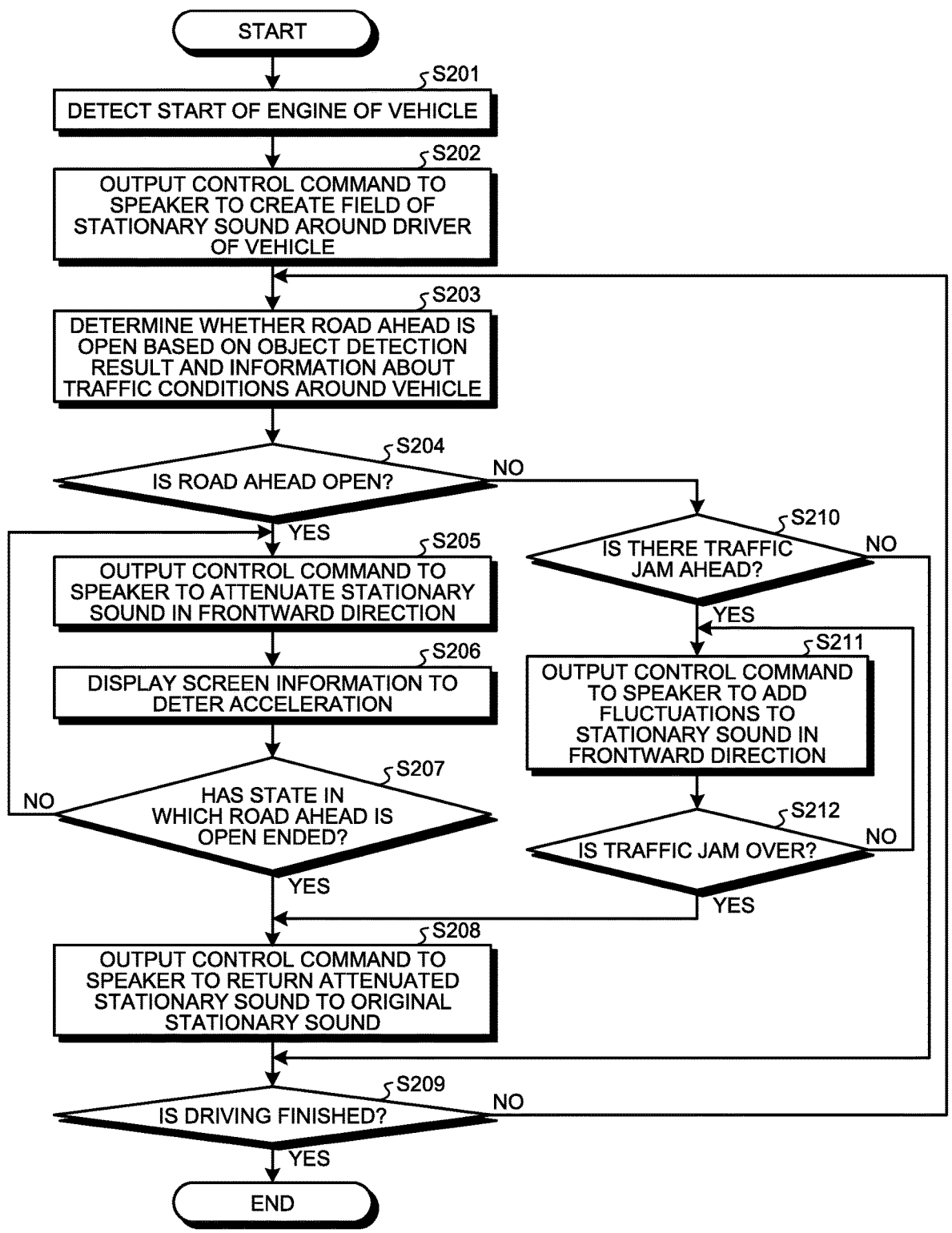
FIG. 12 is a flowchart illustrating processing procedures of the driving assistance apparatus according to the second embodiment.

Next, an example of processing procedures of the driving assistance apparatus 200 according to the second embodiment will be described. FIG. 12 is a flowchart of processing procedures of the driving assistance apparatus according to the second embodiment. As illustrated in FIG. 12, the output control unit 263 of the driving assistance apparatus 200 detects start of the engine of the vehicle 10 (step S201). The output control unit 263 outputs a control command to the speaker 13, to create a field of the stationary sound around the driver 1 of the vehicle 10 (step S202).

The output control unit 263 determines whether the road ahead is open based on a detection result of an object and a state of traffic conditions around the vehicle 10 (step S203). When the road ahead is open (step S204) YES), the output control unit 263 outputs a control command to the speaker to attenuate the stationary sound in a frontward direction (step S205).

The output control unit 263 displays screen information to suppress acceleration operation (step S206). The output control unit 263 shifts to step S205 when the state in which the road ahead is open has not changed (step S207: NO).

On the other hand, when the state in which the road ahead is open has ended (step S207: YES), the output control unit 263 outputs a control command to the speaker to return to the original stationary sound from the attenuated stationary sound (step S208). When driving is finished (step S209: YES), the driving assistance apparatus 200 ends the processing. On the other hand, when driving is not finished (step S109: NO), the driving assistance apparatus 200 shifts to step S203.

On the other hand, at step S204, when the road ahead is not open (step S204: NO), the output control unit 263 determines whether there is a traffic jam ahead (step S210). When there is no traffic jam ahead (step S210: NO), the output control unit 263 shifts to step S209.

On the other hand, when there is a traffic jam ahead (step S210: YES), the output control unit 263 outputs a control command to the speaker, to add fluctuations to the stationary sound in a frontward direction (step S211). When the traffic jam is not over (step S212: NO), the output control unit 263 shifts to step S211. On the other hand, when the traffic jam is over (step S212: YES), it is shifted to step S208.

Next, an effect of the driving assistance apparatus 200 according to the second embodiment will be described. The driving assistance apparatus 200 acquires traffic conditions around the vehicle 10, and attenuates the stationary sound in the frontward direction of the driver 1 when the road ahead is open. By thus attenuating the stationary sound in the frontward direction of the driver 1, it is possible to give a sense of openness to the driver 1, and to create a sense of speed higher than the actual speed. Therefore, it is possible to deter the driver 1 from increasing the driving speed of a vehicle.

For the driving assistance apparatus 100 (200) described above, a case in which an edge image is generated for each image information included in the video information, to detect an object has been described, but the processing of detecting an object is not limited to the described processing. For example, the detecting unit 162 may input image information to a neural network (NN) in which parameters to detect an object have been trained, to detect an object. The driving assistance apparatus 100 may detect an object from the surroundings of the vehicle 10 by using a distance sensor or the like, and may detect an object by comparing the position information of the vehicle 10 with map data.

Furthermore, the vehicle 10 has been used as an example of a mobile body to describe the present embodiment, but the mobile body is not limited thereto. The mobile body may include train, an airplane, a motorcycle, and the like. For example, when the mobile body is an airplane, the driving as apparatus 100 creates a field of the stationary sound above, below, left, and right of the pilot by using plural speakers. When detecting an object in an upward direction, a downward direction, a leftward direction, and a rightward direction, the driving assistance apparatus 100 attenuates the output of the stationary sound in a direction toward the pilot from the object in the field of the stationary sound.

The output control unit 263 according to the present embodiment may refer to the acceleration information of the vehicle information buffer 154, and may attenuate the stationary sound in the frontward of the driver 1 when the acceleration of the vehicle 10 reaches a predetermined acceleration or higher. Thus, the driver 1 can gain a sense of speed higher than a normal speed, and it is possible to suppress the speed of the vehicle 10.

The output control unit 263 according to the present embodiment may control attenuation of the stationary sound based on whether there is traffic jam, not based on a detection result of the detecting unit 262. For example, when there is no traffic jam ahead, the output control unit 263 may attenuate the stationary sound in the frontward direction of the driver 1. Thus, it is possible to make the driver 1 sense a risk, and to deter from increasing the driving speed of the vehicle 10.

Figure 13:
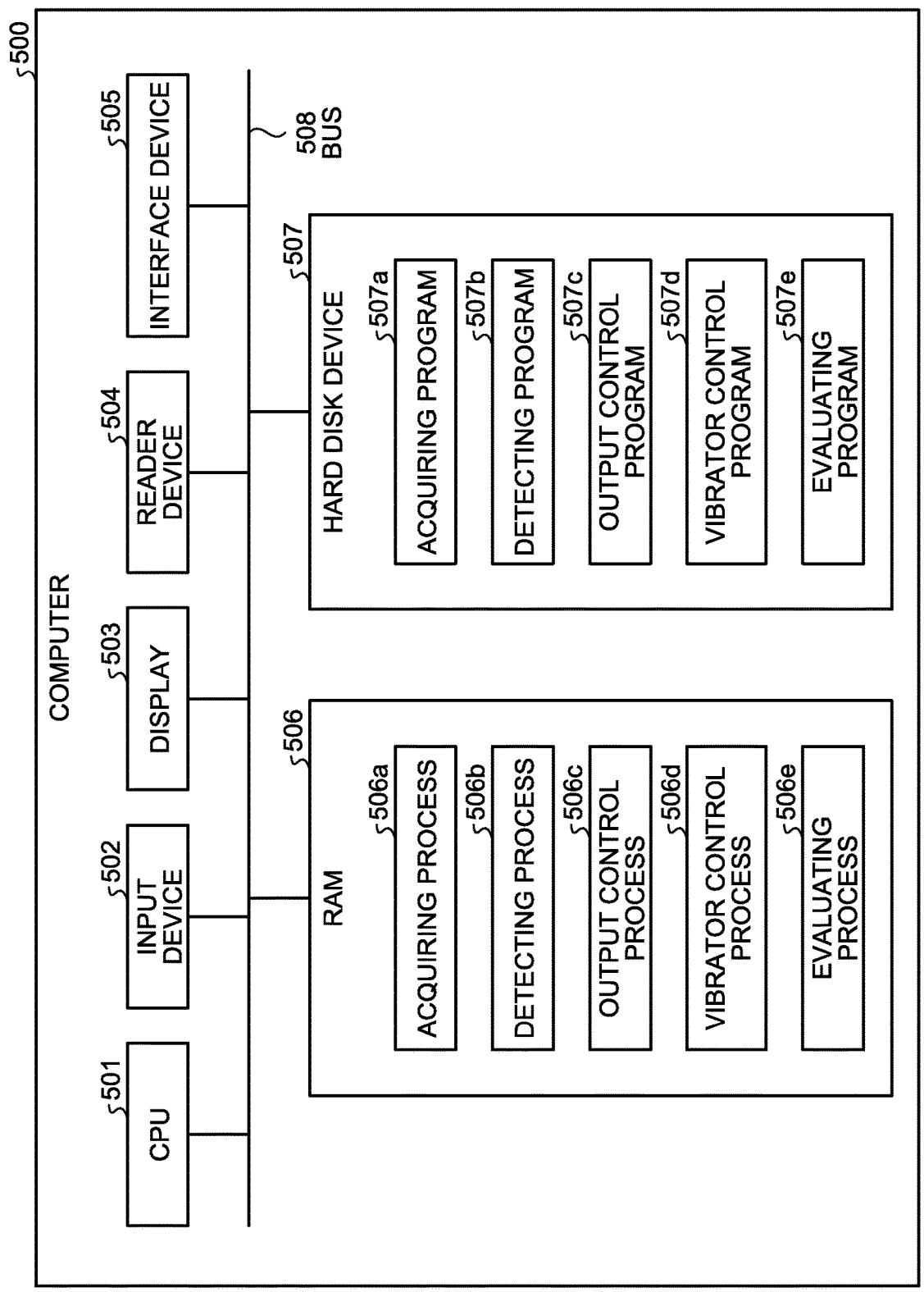
FIG. 13 illustrates an example of a hardware configuration of a computer to implement functions similar to those of the driving assistance apparatus according to the present embodiment.

Next, an example of a hardware configuration of a computer to implement functions similar to those of the driving assistance apparatus 100 (200) described in the first embodiment will be described. FIG. 13 illustrates an example of a hardware configuration of a computer to implement functions similar to those of the driving assistance apparatus according to the present embodiment.

As illustrated in FIG. 13, a computer 500 includes a CPU 501 that executes various kinds of arithmetic processing, an input device 502 that accepts an input of data from a user, and a display 503. Moreover, the computer 500 includes a reader device that reads a program and the like from a recording medium, and an interface device 505. The interface device 505 is connected to the camera 11, the microphone 12, the speaker 13, the inner camera 14, the vibrator 15, the vehicle-information detecting device 20, 25, and the like. The computer 500 includes a RAM that temporarily stores various kinds of information, and a hard disk device 507. The respective devices 501 to 507 are connected to a bus 508.

The hard disk device 507 includes an acquiring program 507a, a detecting program 507b, an output control program 507c, a vibrator control program 507d, and an evaluating program 507e. The CPU 501 reads the acquiring program 507a, the detecting program 507b, the output control program 507c, the vibrator control program 507d, the evaluating program 507e and expands onto the RAM 506.

The acquiring program 507a functions as an acquiring process 506a. The detecting program 507b functions as a detecting process 506b. The output control program 507c functions as an output control process 506c. The vibrator control program 507d functions as a vibrator control process 506d. The evaluating program 507e functions as an evaluating process 506e.

Processing of the acquiring process 506a corresponds to the processing of the acquiring units 161, 261. Processing of the detecting process 506b corresponds to the processing of the detecting units 162, 262. Processing of the output control process 506c corresponds to the processing of the output control units 163, 263. Processing of the vibrator control process 506d corresponds to the processing of the vibrator control units 164, 264. Processing of the evaluating process 506e corresponds to the processing of the evaluating units 165, 265.

The respective programs 507a to 507e are not necessarily requested to be stored in the hard disk device 507 from the beginning. For example, it may be configured such that the respective programs are stored in a "portable physical medium", such as a flexible disk (FD), a compact disk read-only memory (CD-ROM), a digital a versatile disk (DVD), a magneto-optical disk and an integrated circuit (IC) card, inserted to the computer 500. Furthermore, it may be configured such that the computer 500 reads and executes the respective programs 507a to 507e therefrom.

Risk notification is achieved without putting pressure on a subject aboard a mobile body.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A driving assistance apparatus comprising:
   a memory; and
   a processor coupled to the memory and configured to:
   detect a state of surroundings of a mobile body,
   reduce, when an object is detected during when a stationary sound is continuously output to a subject by using a plurality of sound sources that are arranged around the subject aboard the mobile body, output of the stationary sound toward the subject from a direction in which the object is detected, and
   reduce the output of the stationary sound toward the subject from the frontward direction of the subject when acceleration of the mobile body reaches a predetermined acceleration or higher.

2. The driving assistance apparatus according to claim 1, wherein the processor is further configured to:
   collect sound of the surroundings of the mobile body, and
   output a sound collected, the sound from the direction in which the object is detected, toward the subject from the direction in which the object is detected.

3. The driving assistance apparatus according to claim 2, wherein the processor is further configured to reduce the output of the stationary sound toward the subject from the direction in which the object is detected, and output the sound from the direction in which the object is detected toward the subject.

4. The driving assistance apparatus according to claim 1, wherein the processor is further configured to reduce the output of the stationary sound toward the subject from a frontward direction of the subject when there is no traffic jam ahead of the mobile body.

5. The driving assistance apparatus according to claim 1, wherein the processor is further configured to generate fluctuations in the stationary sound toward the subject from the frontward direction of the subject when there is a traffic jam ahead of the mobile body.

6. A driving assistance method comprising:
   detecting a state of surroundings of a mobile body, by a processor;
   reducing, when an object is detected during when a stationary sound is continuously output to a subject by using a plurality of sound sources that are arranged around the subject aboard the mobile body, output of the stationary sound toward the subject from a direction in which the object is detected; and
   reducing the output of the stationary sound toward the subject from the frontward direction of the subject when acceleration of the mobile body reaches a predetermined acceleration or higher.

7. The driving assistance method according to claim 6, further including outputting a sound collected by a sound collector, the sound from the direction in which the object is detected, toward the subject from the direction in which the object is detected.

8. The driving assistance method according to claim 7, wherein the outputting includes outputting the sound of the direction in which the object is detected toward the subject from the direction in which the object is detected after reducing the output of the stationary sound toward the subject from the direction in which the object is detected.

9. The driving assistance method according to claim 6, further including reducing the output of the stationary sound toward the subject from a frontward direction of the subject when there is no traffic jam ahead of the mobile body.

10. The driving assistance method according to claim 6, further including generating fluctuations in the stationary sound toward the subject from the frontward direction of the subject when there is a traffic jam ahead of the mobile body.

11. A non-transitory computer-readable recording medium storing therein a driving assistance program that causes a computer to execute a process comprising:
   detecting a state of surroundings of a mobile body;
   reducing, when an object is detected during when a stationary sound is continuously output to a subject by using a plurality of sound sources that are arranged around the subject aboard the mobile body, output of the stationary sound toward the subject from a direction in which the object is detected; and
   reducing the output of the stationary sound toward the subject from the frontward direction of the subject when acceleration of the mobile body reaches a predetermined acceleration or higher.

12. The non-transitory computer-readable recording medium according to claim 11, wherein the process further includes outputting a sound collected by a sound collector, the sound from the direction in which the object is detected, toward the subject from the direction in which the object is detected.

13. The non-transitory computer-readable recording medium according to claim 12, wherein the process further includes outputting the sound of the direction in which the object is detected toward the subject from the direction in which the object is detected after reducing the output of the stationary sound toward the subject from the direction in which the object is detected.

14. The non-transitory computer-readable recording medium according to claim 11, wherein the process further includes reducing the output of the stationary sound toward the subject from a frontward direction of the subject when there is no traffic jam ahead of the mobile body.

15. The non-transitory computer-readable recording medium according to claim 11, wherein the process further includes generating fluctuations in the stationary sound toward the subject from the frontward direction of the subject when there is a traffic jam ahead of the mobile body.

* * * * *